(12) United States Patent
Yuan et al.

(10) Patent No.: US 12,057,913 B2
(45) Date of Patent: Aug. 6, 2024

(54) PRECODER INDICATION IN DOWNLINK CONTROL INFORMATION

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/758,926

(22) PCT Filed: Jan. 31, 2020

(86) PCT No.: PCT/CN2020/074102
§ 371 (c)(1),
(2) Date: Jul. 15, 2022

(87) PCT Pub. No.: WO2021/151242
PCT Pub. Date: Aug. 5, 2021

(65) Prior Publication Data
US 2023/0052449 A1 Feb. 16, 2023

(51) Int. Cl.
*H04B 7/06* (2006.01)
*H04B 7/0404* (2017.01)

(52) U.S. Cl.
CPC ......... *H04B 7/0639* (2013.01); *H04B 7/0404* (2013.01)

(58) Field of Classification Search
CPC ............................ H04B 7/0639; H04B 7/0404
See application file for complete search history.

(56) References Cited

U.S. PATENT DOCUMENTS

| 2015/0288505 | A1 | 10/2015 | Park et al. |
| 2018/0367205 | A1 | 12/2018 | Liu et al. |
| 2019/0089429 | A1 | 3/2019 | Wei et al. |
| 2019/0207731 | A1 | 7/2019 | Park et al. |
| 2019/0349033 | A1 | 11/2019 | Fakoorian et al. |
| 2020/0145929 | A1* | 5/2020 | Ryu ............... H04W 52/242 |

(Continued)

FOREIGN PATENT DOCUMENTS

| CN | 110612734 A | 12/2019 |
| WO | WO-2019162917 A1 | 8/2019 |

OTHER PUBLICATIONS

CATT: "On UL Codebook Design and Signaling", R1-1704546, 3GPP TSG RAN WG1 Meeting #88bis, Spokane, USA Apr. 3-7, 2017, Apr. 7, 2017, 4 Pages, sections 1-2.

(Continued)

*Primary Examiner* — Janice N Tieu
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information that identifies a first precoder indicator selected from a set of precoder indicators and a second precoder indicator selected from a subset of the set of precoder indicators. The UE may communicate using multiple antenna panels based at least in part on the first precoder indicator and the second precoder indicator. Numerous other aspects are provided.

27 Claims, 8 Drawing Sheets

(56) References Cited

U.S. PATENT DOCUMENTS

2022/0329310 A1* 10/2022 Pan .................... H04W 72/23
2023/0091465 A1    3/2023 Yuan et al.
2023/0336223 A1* 10/2023 Park .................... H04L 5/0051
                                                  370/329

OTHER PUBLICATIONS

Intel Corporation: "On Codebook Based UL Transmission", R1-1704719, 3GPP TSG- RAN WG1 #88bis, Spokane, USA, Apr. 3-7, 2017, Apr. 7, 2017, pp. 1-4, sections 1-2.
International Search Report and Written Opinion—PCT/CN2020/074102—ISA/EPO—Oct. 28, 2020.
ZTE: "Codebook Based UL Transmission", R1-1710176, 3GPP TSG RAN WG1 NR Ad-Hoc#2, Qingdao, P.R. China Jun. 27-30, 2017, Jun. 30, 2017, pp. 1-5, sections 1-3.
ETSI TS 138 212, V15.5.0: "5G, NR, Multiplexing and Channel Coding (3GPP TS 38.212 Version 15.5.0 Release 15)", May 2019, 104 Pages, Tables 7.3.1.1.2-31 and 7.3.1.1.2-2.
ETSI TS 138.211, Version 15.5.0: "5G, NR, Physical Channels and Modulation (3GPP TS 38.211 Version 15.5.0 Release 15)", ETSI Technical Specification, European Telecommunications Standards Institute (ETSI), 650, Route Des Lucioles, F-06921 Sophia-Antipolis, France, vol. 3GPP RAN, No. V15.5.0, Apr. 30, 2019, 98 Pages, XP014345019, Section 6.3.3.2, Table 6.3.1.5-3.
Supplementary European Search Report—EP20916362—Search Authority—The Hague—Sep. 29, 2023.
Mediatek Inc: "Design Details on Beam Failure Recovery", 3GPP TSG RAN WG1 Meeting #90bis, R1-1718334, Prague, Czechia, Oct. 9-13, 2017, 8 pages.

* cited by examiner

PRECODER INDICATION IN DOWNLINK CONTROL INFORMATION

CROSS-REFERENCE TO RELATED APPLICATION

This Patent Application is a 371 national stage of PCT Application No. PCT/CN2020/074102 filed on Jan. 31, 2020, entitled "PRECODER INDICATION IN DOWNLINK CONTROL INFORMATION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for precoder indication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving downlink control information (DCI) that identifies a first precoder indicator selected from a set of precoder indicators and a second precoder indicator selected from a subset of the set of precoder indicators. The method may include communicating using multiple antenna panels based at least in part on the first precoder indicator and the second precoder indicator.

In some aspects, a method of wireless communication, performed by a base station (BS), may include selecting a first precoder indicator from a set of precoder indicators and a second precoder indicator from a subset of the set of precoder indicators. The method may include transmitting DCI that identifies the first precoder indicator and the second precoder indicator to enable a UE to communicate using multiple antenna panels based at least in part on the first precoder indicator and the second precoder indicator.

In some aspects, a UE for wireless communication may include memory and one or more processors coupled to the memory. The memory and the one or more processors may be configured to receive DCI that identifies a first precoder indicator selected from a set of precoder indicators and a second precoder indicator selected from a subset of the set of precoder indicators. The memory and the one or more processors may be configured to communicate using multiple antenna panels based at least in part on the first precoder indicator and the second precoder indicator.

In some aspects, a BS for wireless communication may include memory and one or more processors coupled to the memory. The memory and the one or more processors may be configured to select a first precoder indicator from a set of precoder indicators and a second precoder indicator from a subset of the set of precoder indicators. The memory and the one or more processors may be configured to transmit DCI that identifies the first precoder indicator and the second precoder indicator to enable a UE to communicate using multiple antenna panels based at least in part on the first precoder indicator and the second precoder indicator.

In some aspects, a non-transitory computer-readable medium may store one or more instructions for wireless communication. The one or more instructions, when executed by one or more processors of a UE, may cause the one or more processors to receive DCI that identifies a first precoder indicator selected from a set of precoder indicators and a second precoder indicator selected from a subset of the set of precoder indicators. The one or more instructions may cause the one or more processors to communicate using multiple antenna panels based at least in part on the first precoder indicator and the second precoder indicator.

In some aspects, a non-transitory computer-readable medium may store one or more instructions for wireless communication. The one or more instructions, when executed by one or more processors of a BS, may cause the one or more processors to select a first precoder indicator from a set of precoder indicators and a second precoder indicator from a subset of the set of precoder indicators. The one or more instructions may cause the one or more pro-cessors to transmit DCI that identifies the first precoder indicator and the second precoder indicator to enable a UE to communicate using multiple antenna panels based at least in part on the first precoder indicator and the second precoder indicator.

In some aspects, an apparatus for wireless communication may include means for receiving DCI that identifies a first precoder indicator selected from a set of precoder indicators and a second precoder indicator selected from a subset of the set of precoder indicators. The apparatus may include means for communicating using multiple antenna panels based at least in part on the first precoder indicator and the second precoder indicator.

In some aspects, an apparatus for wireless communication may include means for selecting a first precoder indicator from a set of precoder indicators and a second precoder indicator from a subset of the set of precoder indicators. The apparatus may include means for transmitting DCI that identifies the first precoder indicator and the second precoder indicator to enable a UE to communicate using multiple antenna panels based at least in part on the first precoder indicator and the second precoder indicator.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
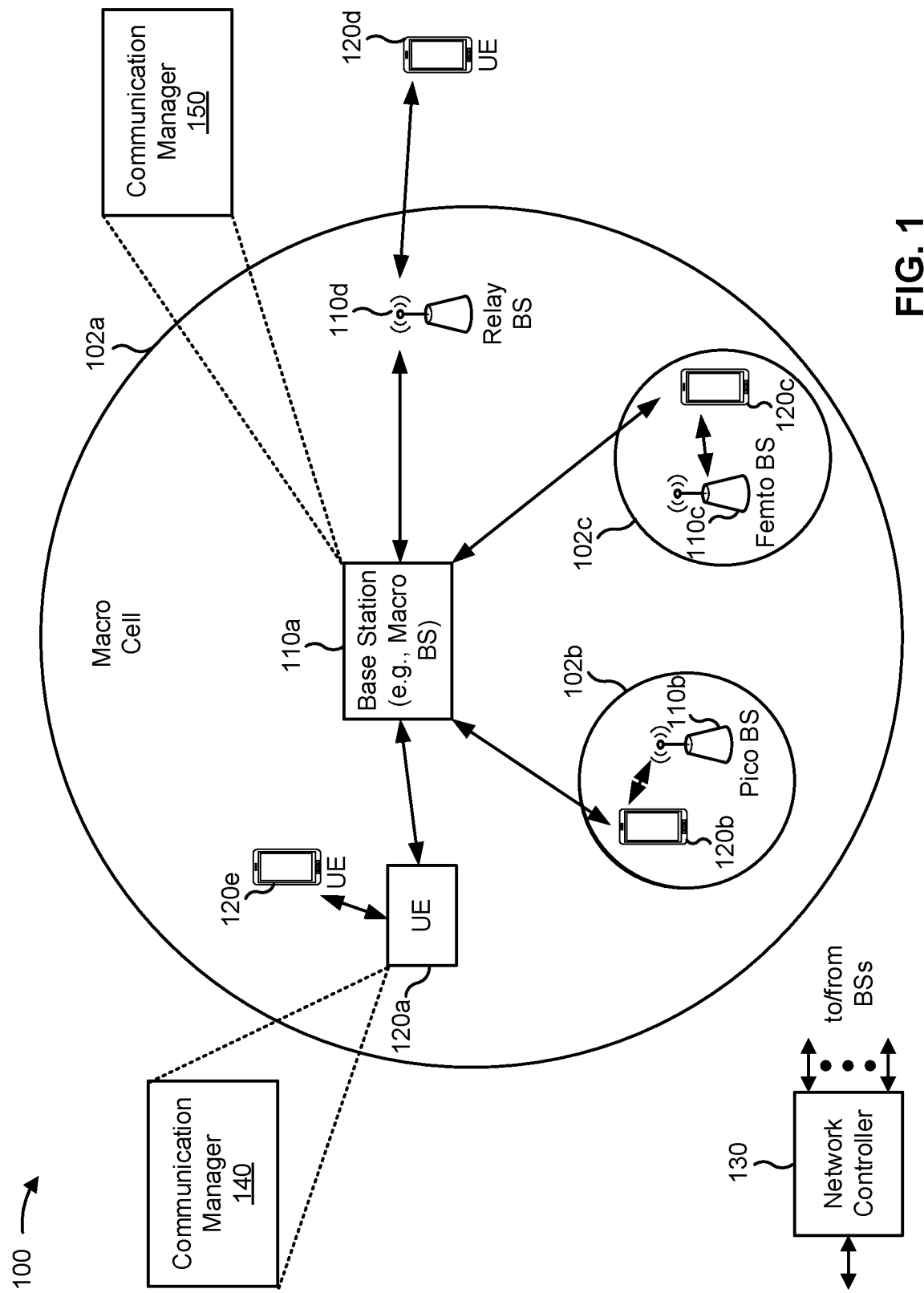
FIG. 1 is a block diagram conceptually illustrating an example of a wireless communication network, in accordance with various aspects of the present disclosure.

A base station (BS) may schedule or configure uplink transmissions for a user equipment (UE) (e.g., in a physical uplink shared channel (PUSCH)). For example, the BS may transmit downlink control information (DCI) that schedules an uplink transmission of the UE. In some cases, the uplink transmission may be a multi-panel transmission. For a multi-panel transmission, the UE may use multiple antenna panels to transmit an uplink communication, such as in a spatial division multiplexing, frequency division multiplexing, or time division multiplexing manner.

DCI that schedules a multi-panel transmission may indicate respective precoders for each antenna panel of the multi-panel transmission. The DCI may indicate a precoder by identifying a transmit precoder matrix indicator (TPMI) index or a sounding reference signal (SRS) resource indicator (SRI) index. For example, DCI that schedules an uplink communication on two antenna panels may identify two TPMI indices or two SRI indices. Accordingly, DCI that schedules a multi-panel transmission may use a same quantity of bits to indicate respective precoders for each antenna panel of the multi-panel transmission.

Some techniques and apparatuses described herein facilitate scheduling of multi-panel transmissions with greater efficiency. In some aspects, DCI scheduling a multi-panel transmission may identify a first precoder indicator (e.g., a TPMI index or an SRI index) selected from a set of precoder indicators and a second precoder indicator selected from a subset of the set of precoder indicators. In this way, a quantity of bits of the DCI that is needed to identify the second precoder indicator may be reduced, thereby improving a size of the DCI.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as may be implemented as NB-IOT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may receive DCI that identifies a first precoder indicator selected from a set of precoder indicators and a second precoder indicator selected from a subset of the set of precoder indicators, and communicate using multiple antenna panels based at least in part on the first precoder indicator and the second precoder indicator. Additionally, or alternatively, the communication manager 140 may perform one or more other operations described herein.

Similarly, the BS 110 may include a communication manager 150. As described in more detail elsewhere herein, the communication manager 150 may select a first precoder indicator from a set of precoder indicators and a second precoder indicator from a subset of the set of precoder indicators, and transmit DCI that identifies the first precoder indicator and the second precoder indicator to enable a UE to communicate using multiple antenna panels based at least in part on the first precoder indicator and the second precoder indicator. Additionally, or alternatively, the communication manager 150 may perform one or more other operations described herein.

As indicated above, FIG. 1 is provided merely as an example. Other examples may differ from what is described with regard to FIG. 1.

Figure 2:
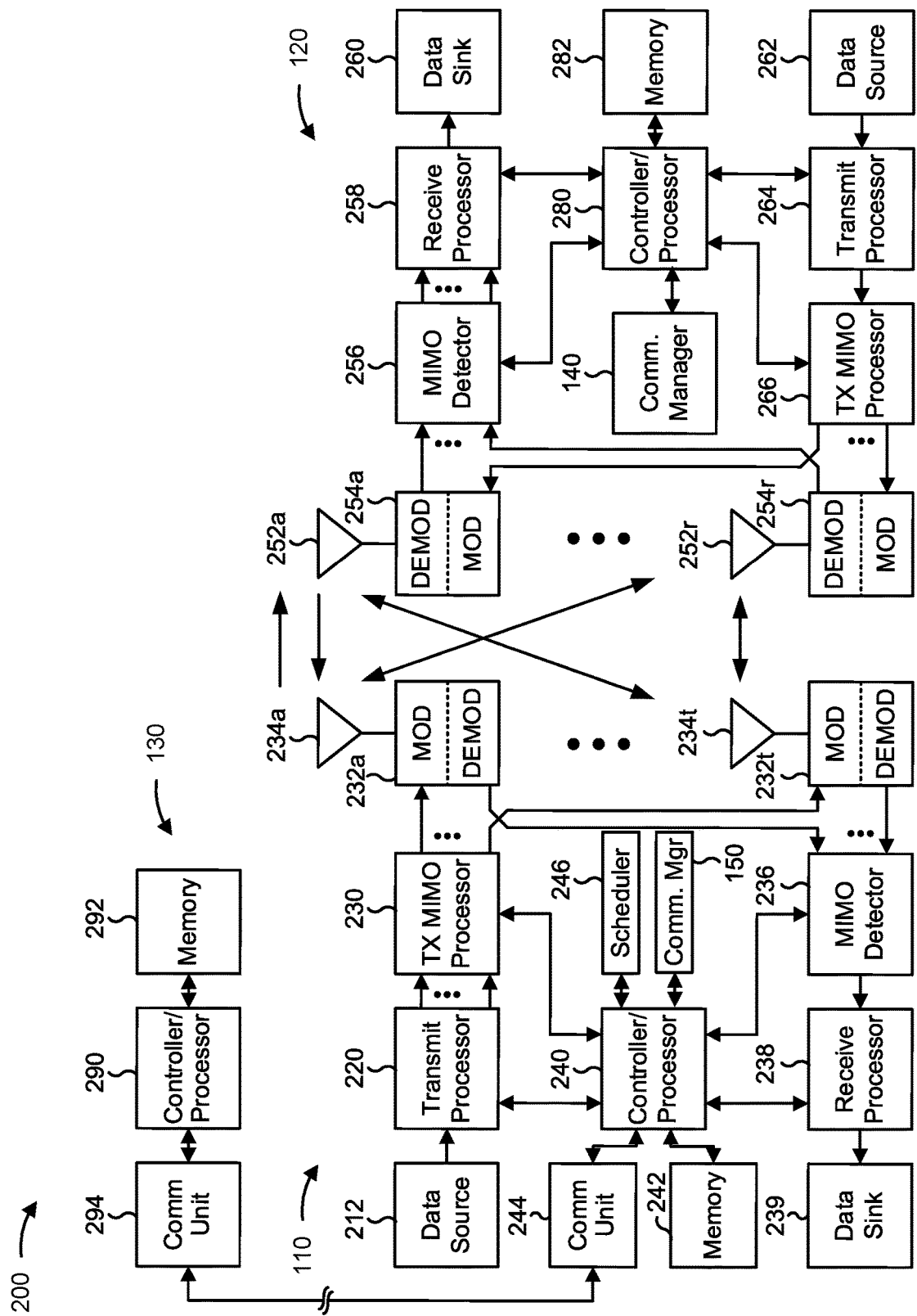
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with precoder indication in DCI, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for receiving DCI that identifies a first precoder indicator selected from a set of precoder indicators and a second precoder indicator selected from a subset of the set of precoder indicators, means for communicating using multiple antenna panels based at least in part on the first precoder indicator and the second precoder indicator, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for selecting a first precoder indicator from a set of precoder indicators and a second precoder indicator from a subset of the set of precoder indicators, means for transmitting DCI that identifies the first precoder indicator and the second precoder indicator to enable a UE to communicate using multiple antenna panels based at least in part on the first precoder indicator and the second precoder indicator, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

As described above, DCI that schedules a multi-panel transmission may indicate respective precoders for each antenna panel of the multi-panel transmission. Accordingly, DCI that schedules a multi-panel transmission may use significant overhead to indicate respective precoders for each antenna panel of the multi-panel transmission. Some techniques and apparatuses described herein facilitate scheduling of multi-panel transmissions with greater efficiency. In some aspects, DCI scheduling a multi-panel transmission may identify a first precoder indicator (e.g., a TPMI index or an SRI index) selected from a set of precoder indicators and a second precoder indicator selected from a subset of the set of precoder indicators. In this way, a quantity of bits of the DCI that is needed to identify the second precoder indicator may be reduced, thereby enabling reduction to an overhead of the DCI.

Figure 3A:
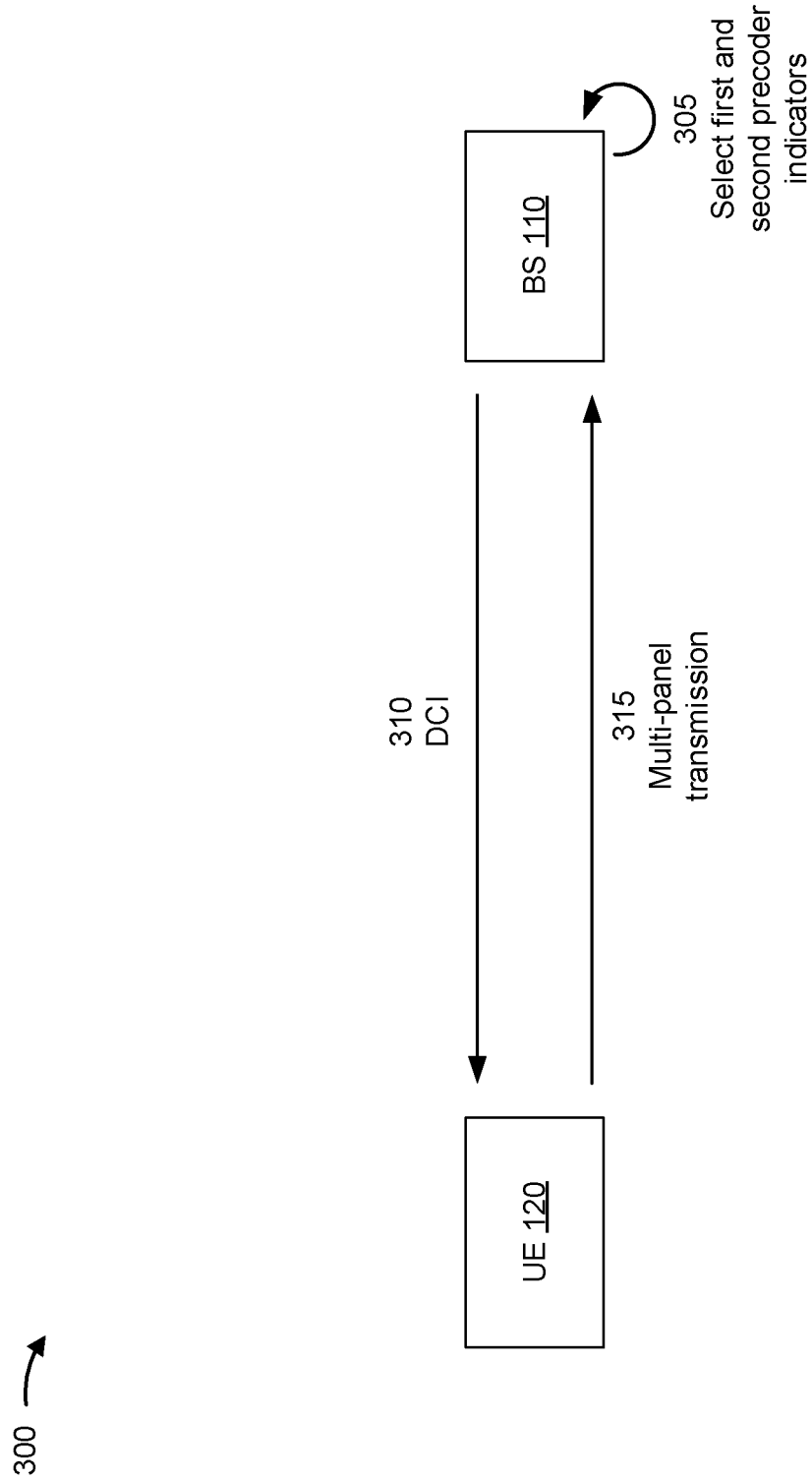
FIGS. 3A and 3B are diagrams illustrating examples of precoder indication in downlink control information (DCI), in accordance with various aspects of the present disclosure.
Figure 3B:
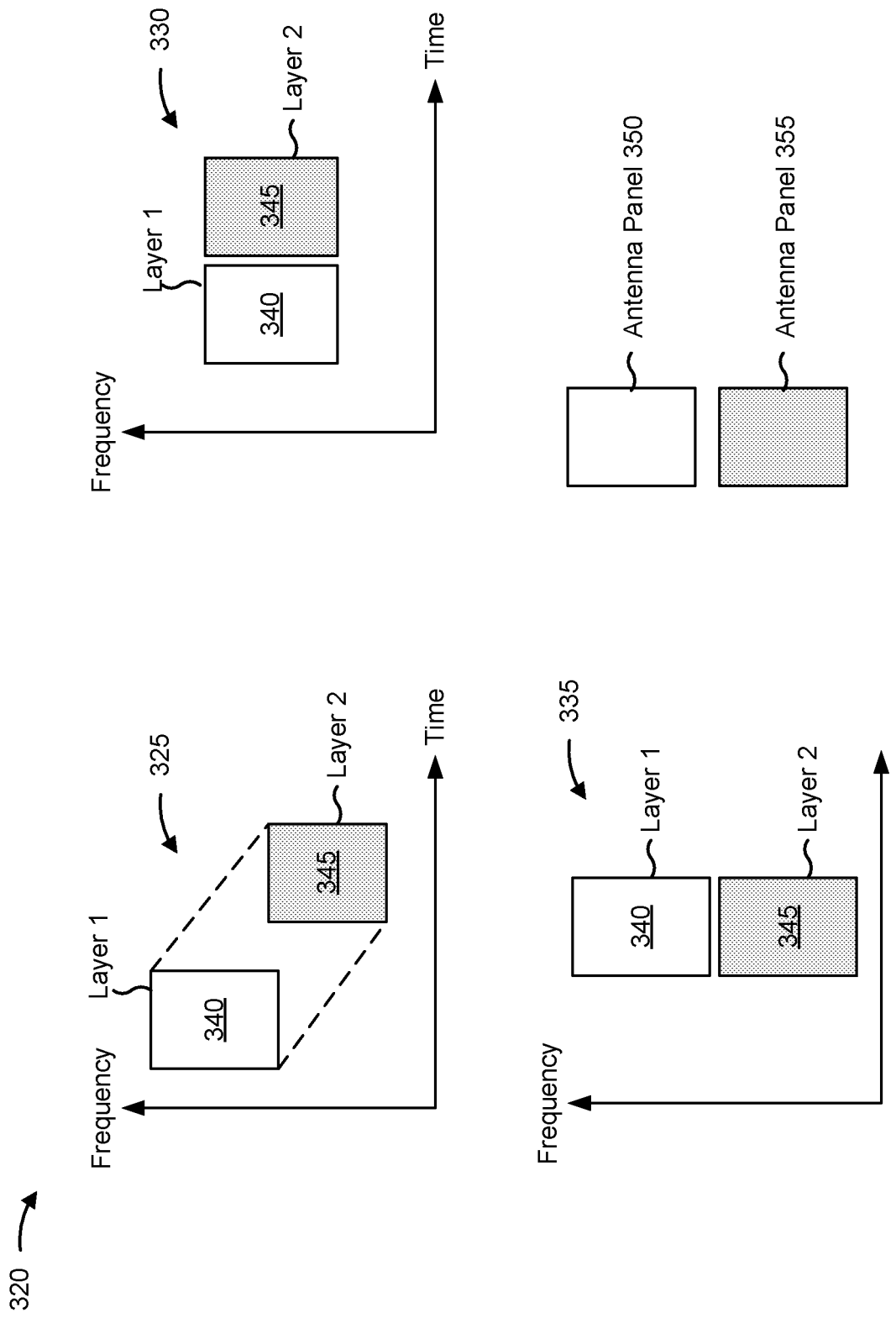

FIGS. 3A and 3B are diagrams illustrating examples 300 and 320, respectively, of precoder indication in DCI, in accordance with various aspects of the present disclosure. As shown in FIG. 3A, a UE 120 and a BS 110 may communicate in connection with an uplink multi-panel transmission of the UE 120. In some aspects, the UE 120 may employ multiple transmit antenna panels. The antenna panels may be a group of antenna ports or an antenna group. The uplink multi-panel transmission may be in a spatial-division multiplexed manner, a time-division multiplexed manner, or a frequency-division multiplexed manner, as described in connection with FIG. 3B.

As shown by reference number 305, the BS 110 may select a first precoder indicator and a second precoder indicator that are to be used by the UE 120 for an uplink multi-panel transmission. A precoder indicator may identify a TPMI (e.g., for a codebook-based multi-panel transmission) or an SRI (e.g., for a noncodebook-based multi-panel transmission).

In some aspects, a precoder indicator may be an index (e.g., an SRI index) of a mapping of indices to SRI combinations (e.g., combinations of 1, 2, 3, or 4 SRIs, where the quantity of SRIs in an SRI combination indicates a transmission rank (e.g., a quantity of layers)). As an example, an index of [7] may map to an SRI combination of [1, 2] (where precoders used to transmit SRS resources identified by 1 and 2 are to be used for a two-layer (i.e., a transmission rank of two) uplink transmission), an index of [12] may map to an SRI combination of [0, 2, 3] (where precoders used to transmit SRS resources identified by 0, 2, and 3 are to be used for a three-layer (i.e., a transmission rank of three) uplink transmission), and the like (additional examples are provided in 3GPP Technical Specification (TS) 38.212, such as in Table 7.3.1.1.2-31). A particular mapping of indices to SRI combinations that is to be used may be based at least in part on a quantity of SRSs configured for the UE 120.

In some aspects, a precoder indicator may be an index (e.g., a TPMI index) of a mapping of indices to transmission rank and TPMI combinations. As an example, an index of [9] may map to a transmission rank and TPMI combination of [2 layers, TPMI=5] (where a codeword mapped (in another mapping) to an index of 5 is associated with a two-layer (i.e., a transmission rank of two) uplink transmission), an index of [29] may map to a transmission rank and TPMI combination of [3 layers, TPMI=2] (where a codeword mapped (in another mapping) to an index of 2 is associated with a three-layer (i.e., a transmission rank of three) uplink transmission), and the like (additional examples are provided in 3GPP TS 38.211, such as in Table 6.3.1.5-3, or TS 38.212, such as in Table 7.3.1.1.2-2). A particular mapping of indices to transmission rank and TPMI combinations that is to be used may be based at least in part on whether the UE 120 is capable of full coherence transmission (e.g., transmission using 4 antenna ports), partial coherence transmission (e.g., transmission using 2 antenna ports out of 4 antenna ports), or non-coherence transmission (e.g., transmission using 1 antenna port of 4 antenna ports).

The BS 110 may select the first precoder indicator from a set of precoder indicators, and may select the second precoder indicator from a subset of the set of precoder indicators. For example, the set of precoder indicators may include all indices of a mapping (e.g., the mapping for SRI combinations or the mapping for transmission rank and TPMI combinations), and the subset of the set may include a subset of the indices of the mapping. In some aspects, the precoder indicators that are included in the subset from which the second precoder indicator is selected may be based at least in part on the first precoder indicator that is selected by the BS 110. Thus, the subset may include fewer precoder indicators than the set of precoder indicators.

The first precoder indicator selected by the BS 110 may be associated with a particular transmission rank and/or a particular coherence type (e.g., full coherence, partial coherence, or non-coherence). In the case of the mapping for SRI combinations, the transmission rank may correspond to a quantity of SRIs included in an SRI combination. In the case of the mapping for transmission rank and TPMI combinations, the transmission rank is explicitly indicated. Moreover, a TPMI, of a transmission rank and TPMI combination, may be associated with a coherence type (e.g., a quantity of antenna ports).

Accordingly, the precoder indicators that are included in the subset from which the second precoder indicator is selected may be based at least in part on the particular transmission rank and/or the particular coherence type associated with the first precoder indicator selected by the BS 110. In other words, the second precoder indicator may be selected from a restricted group of precoder indicators that is dependent upon the selected first precoder indicator. In this way, the second precoder indicator may be identified using less bits (relative to the first precoder indicator) because the subset is a restricted group of precoder indicators (relative to the set of precoder indicators). This can reduce the overhead in DCI that identifies the second precoder indication.

In some aspects, the subset includes only the precoder indicators of the set that are associated with the particular transmission rank of the selected first precoder indicator. For example, the set may include precoder indicators associated with a transmission rank of 1, 2, 3, or 4, and the selected first precoder indicator may be associated with a transmission rank of 3. Accordingly, the subset may include only precoder indicators of the set that are associated with a transmission rank of 3. In some aspects, the subset includes only the precoder indicators of the set that are associated with transmission ranks that, when respectively combined with a transmission rank associated with the selected first precoder indicator, satisfy a threshold value (e.g., is less than a maximum transmission rank).

In some aspects, the subset includes only the precoder indicators of the set that are associated with the particular transmission rank of the selected first precoder indicator, as described above, and the particular coherence type of the selected first precoder indicator. For example, the set may include precoder indicators associated with any of full coherence, partial coherence, or non-coherence, and the selected first precoder indicator may be associated with partial coherence. Accordingly, the subset may include only precoder indicators of the set that are associated with partial coherence.

As shown by reference number 310, the BS 110 may transmit, and the UE 120 may receive, DCI that schedules uplink transmissions of the UE 120. For example, the DCI may schedule a multi-panel transmission of the UE 120, such as a first PUSCH communication (e.g., of multiple layers) on a first antenna panel of the UE 120 and a second PUSCH communication (e.g., of multiple layers) on a second antenna panel of the UE 120. In some aspects, the UE 120 may receive the DCI from a first TRP (e.g., associated with the BS 110), and the DCI may schedule an uplink multi-panel transmission to the first TRP and a second TRP (e.g., associated with the BS 110 or another BS).

The DCI may identify (e.g., in the same field or in two separate fields of the DCI) the first precoder indicator and the second precoder indicator selected by the BS 110. For example, the DCI may identify a first TPMI index and a second TPMI index selected by the BS 110 in a TPMI field of the DCI. As another example, the DCI may identify a first SRI index and a second SRI index selected by the BS 110 in an SRI field of the DCI. In this way, the UE 120 may apply a precoder associated with the first TPMI index or SRI index to transmit a first PUSCH transmission, and apply a precoder associated with the second TPMI index or SRI index to transmit a second PUSCH transmission.

The DCI may identify the first precoder indicator using a first quantity of bits and the second precoder indicator using a second quantity of bits that is less than (or in some cases equal to) the first quantity of bits. The second quantity of bits may be a quantity of bits needed to identify a particular precoder indicator of the subset from which the second precoder indicator is selected. That is, because the second precoder indicator is selected from a restricted group of precoder indicators (relative to a group of precoder indicators from which the first precoder indicator is selected), a reduced quantity of bits of the DCI may be allocated to identify the second precoder indicator. In this way, the DCI may have a reduced overhead.

3GPP TS 38.211 specifies that, when transforming precoding is disabled for CP-OFDM in a single panel uplink transmission, a TPMI index, of TPMI indices associated with 4 antenna ports with different transmission ranks and/or different coherence types, may be indicated. Table 1 shows a quantity of bits needed to indicate a TPMI index for a single antenna panel:

TABLE 1

| Transmission Rank | Quantity of TPMI indices associated with full coherence | Quantity of TPMI indices associated with partial coherence | Quantity of TPMI indices associated with non-coherence | Total bits in DCI |
| --- | --- | --- | --- | --- |
| 1 | 16 | 8 | 4 | 5 bits |
| 2 | 8 | 8 | 6 | 6 bits |
| 3 | 4 | 2 | 1 | |
| 4 | 2 | 2 | 1 | |

In some aspects, the first precoder indicator is a first TPMI index associated with full coherence, partial coherence, or non-coherence, and the second precoder indicator is a second TPMI index associated with full coherence, partial coherence, or non-coherence (e.g., when the subset from which the second precoder indicator is selected is restricted to precoder indicators of a particular transmission rank). In this case, the DCI may allocate a quantity of bits for identifying the first TPMI index and the second TPMI index as shown in Table 2 (DCI alignment is used to align a length of DCI under different transmission ranks to be the same):

TABLE 2

| Maximum Transmission Rank (TR) | First TPMI index bits | Second TPMI index bits | Total bits in DCI |
| --- | --- | --- | --- |
| 1 | 5 | 5 | 10 |
| 2, 3, or 4 | 6 | 5, if TR = 1<br>5, if TR = 2<br>3, if TR = 3<br>3, if TR = 4 | 11 (with DCI alignment) |

For example, with reference to Table 2, when a maximum transmission rank is 3, the first TPMI index may be one of 57 TPMI indices, which therefore needs 6 bits to indicate the first TPMI index. Continuing with the previous example, the second TPMI index may be one of 7 TPMI indices (e.g., when the transmission rank is 3), which therefore needs 3 bits to indicate the second TPMI index.

In some aspects, the first precoder indicator is a first TPMI index associated with partial coherence or non-coherence and the second precoder indicator is a second TPMI index associated with partial coherence or non-coherence (e.g., when the subset from which the second precoder indicator is selected is restricted to precoder indicators of a particular transmission rank). In this case, the DCI may allocate a quantity of bits for identifying the first TPMI index and the second TPMI index as shown in Table 3:

TABLE 3

| Maximum Transmission Rank (TR) | First TPMI index bits | Second TPMI index bits | Total bits in DCI |
| --- | --- | --- | --- |
| 1 | 4 | 4 | 8 |
| 2, 3, or 4 | 5 | 4, if TR = 1<br>4, if TR = 2<br>2, if TR = 3<br>2, if TR = 4 | 9 (with DCI alignment) |

In some aspects, the first precoder indicator is a first TPMI index associated with a particular one of full coherence, partial coherence, or non-coherence, and the second precoder indicator is a second TPMI index associated with the same particular one of full coherence, partial coherence, or non-coherence (e.g., the first precoder indicator and the second precoder indicator are associated with the same quantity of antenna ports, such as when the subset from which the second precoder indicator is selected is restricted to precoder indicators of a particular transmission rank and of a particular coherence type). In this case, the DCI may allocate a quantity of bits for identifying the first TPMI index and the second TPMI index as shown in Table 4:

TABLE 4

| Maximum Transmission Rank (TR) | First TPMI index bits | Second TPMI index bits | Total bits in DCI |
|---|---|---|---|
| 1 | 5 | 4 | 9 |
| 2, 3, or 4 | 6 | 4, if TR = 1<br>3, if TR = 2<br>2, if TR = 3<br>1, if TR = 4 | 10 (with DCI alignment) |

In some aspects, the first precoder indicator is a first TPMI index associated with a particular one of partial coherence or non-coherence, and the second precoder indicator is a second TPMI index associated with the same particular one of partial coherence or non-coherence (e.g., the first precoder indicator and the second precoder indicator are associated with the same quantity of antenna ports, such as when the subset from which the second precoder indicator is selected is restricted to precoder indicators of a particular transmission rank and of a particular coherence type). In this case, the DCI may allocate a quantity of bits for identifying the first TPMI index and the second TPMI index as shown in Table 5:

TABLE 5

| Maximum Transmission Rank (TR) | First TPMI index bits | Second TPMI index bits | Total bits in DCI |
|---|---|---|---|
| 1 | 4 | 3 | 7 |
| 2, 3, or 4 | 5 | 3, if TR = 1<br>3, if TR = 2<br>1, if TR = 3<br>1, if TR = 4 | 8 (with DCI alignment) |

In some aspects, the first precoder indicator is a first SRI index and the second precoder indicator is a second SRI index (e.g., when the subset from which the second precoder indicator is selected is restricted to precoder indicators of a particular transmission rank). In this case, the DCI may allocate a quantity of bits for identifying the first SRI index and the second SRI index as shown in Table 6:

TABLE 6

| Maximum quantity of layers (L, corresponding to maximum transmission rank (TR)), Quantity of configured SRSs (N) in an SRS set for non-codebook based MIMO | First SRI index bits | Second SRI index bits | Total bits in DCI |
|---|---|---|---|
| L = 1, N = 2 | 1 | 1 | 2 |
| L = 2, N = 2 | 2 | 1, if TR = 1<br>0, if TR = 2 | 3 |
| L = 1, N = 3 | 2 | 2 | 4 |
| L = 2, N = 3 | 3 | 2, if TR = 1<br>2, if TR = 2 | 5 |
| L = 3, N = 3 | 3 | 2, if TR = 1<br>2, if TR = 2<br>0, if TR = 3 | 5 |
| L = 1, N = 4 | 2 | 2 | 4 |
| L = 2, N = 4 | 4 | 2, if TR = 1<br>3, if TR = 2 | 7 |
| L = 3, N = 4 | 4 | 2, if TR = 1<br>3, if TR = 2<br>2, if TR = 3 | 7 |
| L = 4, N = 4 | 4 | 2, if TR = 1<br>3, if TR = 2<br>2, if TR = 3<br>0, if TR = 4 | 7 |

In some aspects, the DCI may identify frequency resources that are to be used for the multi-panel transmission of the UE 120. For example, the DCI may identify first frequency resources that are to be used for a first antenna panel of the UE 120 and second frequency resources that are to be used for a second antenna panel of the UE 120. The frequency resources may be resource blocks of a precoding resource block group (PRG) or resource blocks of a wideband channel.

Figure 4:
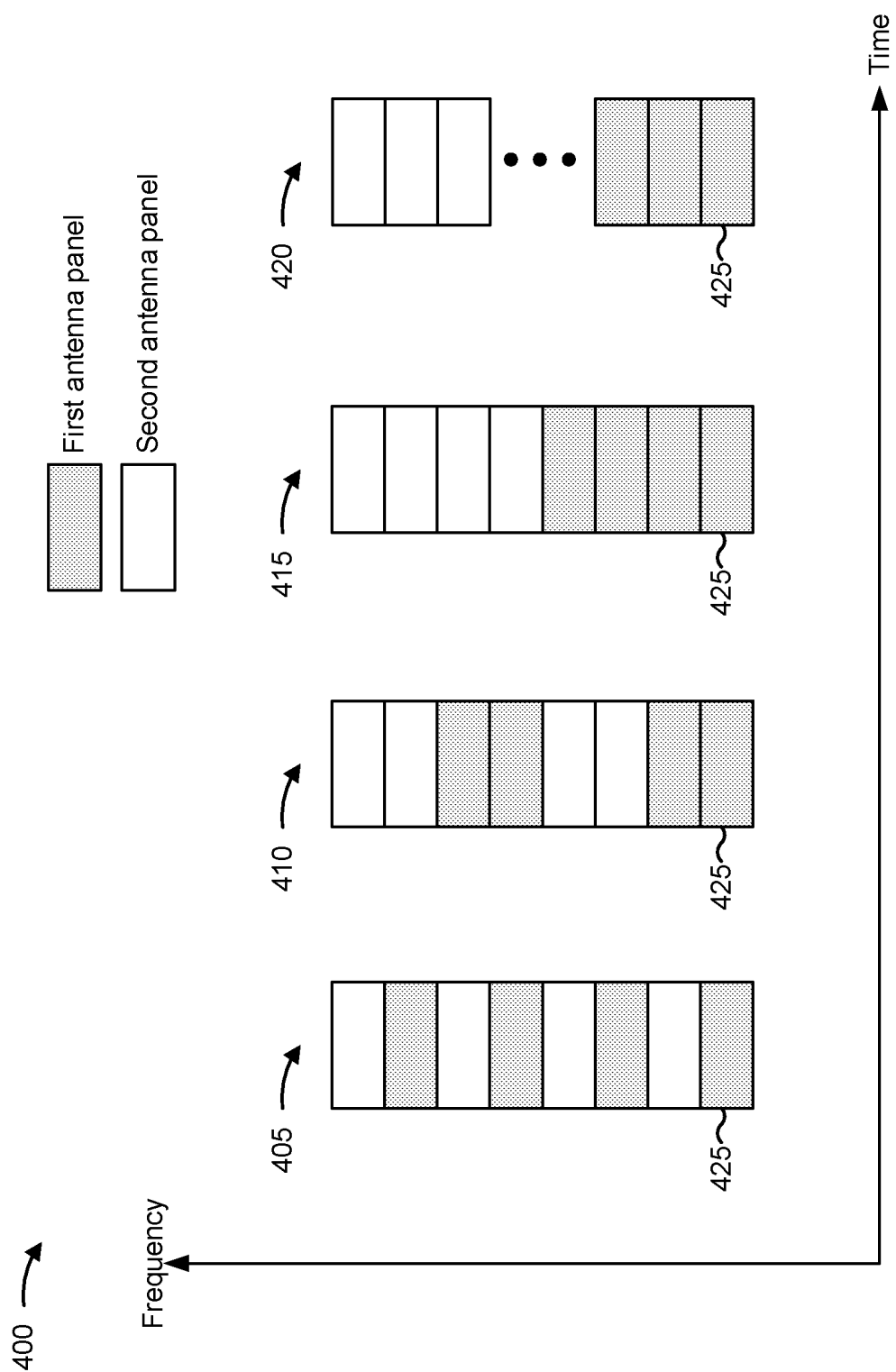
FIG. 4 is a diagram illustrating an example of frequency resource splitting patterns, in accordance with various aspects of the present disclosure.

In some aspects, the DCI may identify a frequency resource splitting pattern, to thereby identify the first frequency resources and the second frequency resources. The frequency resource splitting pattern may indicate a pattern by which a frequency domain is to be split between a first antenna panel and a second antenna panel. Example frequency resource splitting patterns are shown in FIG. 4.

In some aspects, the UE 120 may be configured with a default frequency resource splitting pattern, and the frequency resource splitting pattern is not identified by the DCI. For example, by default, a lower half of a frequency resource allocation may be used for a first PUSCH transmission, and a higher half of the frequency resource allocation may be used for a second PUSCH transmission. Additionally, or alternatively, a frequency resource splitting pattern is identified in a same field of the DCI as the first precoder indicator and the second precoder indicator. In this case, the frequency resource splitting pattern may be identified by 1 or 2 bits. For example, in the case of 1 bit, a first value (e.g., 0) may indicate that a default frequency resource splitting pattern is to be used and a second value (e.g., 1) may indicate that a configured frequency resource splitting pattern (e.g., configured by a radio resource control (RRC) configuration) is to be used. As another example, in the case of 2 bits, the four values of the bits may indicate respective frequency resource splitting patterns that are to be used.

In some aspects, bits of the DCI that are conserved (e.g., by reducing a quantity of bits needed to indicate the second precoder indicator, as described above) may be allocated for indicating the frequency resource splitting pattern. For example, the DCI may allocate a quantity of bits for identifying a first TPMI index, a second TPMI index, and a frequency resource splitting pattern as shown in Table 7:

TABLE 7

| Maximum Transmission Rank (TR) | First TPMI index bits | Second TPMI index bits | Frequency resource splitting pattern bits | Total bits in DCI |
|---|---|---|---|---|
| 1 | 5 | 4 | 1 | 10 |
| 2, 3, or 4 | 6 | 4, if TR = 1<br>3, if TR = 2<br>2, if TR = 3<br>1, if TR = 4 | 0<br>1<br>2<br>2 | 10 (with DCI alignment) |

In some aspects, the first precoder indicator and the second precoder indicator of the DCI may be associated with a respective transmission configuration indicator (TCI) identified in the DCI. In this case, the first precoder indicator may be associated with a first particular TCI and the second precoder indicator may be associated with a second particular TCI. For example, the first precoder indicator may be associated with a first TCI (e.g., first according to an index of an antenna panel associated with the first TCI) and the second precoder indicator may be associated with a second TCI (e.g., second according to an index of an antenna panel of the UE 120 associated with the second TCI). In some aspects, such as when only a single precoder indicator is identified by the DCI (e.g., for a single panel transmission), the single precoder indicator may be associated with a single TCI identified by the DCI.

As shown by reference number 315, the UE 120 may communicate with the BS 110 using multiple antenna panels based at least in part on the DCI. For example, the UE 120 may transmit a multi-panel transmission based at least in part on the first precoder indicator and the second precoder indicator identified by the DCI. In this case, the UE 120 may transmit a first PUSCH communication on a first antenna panel using a precoder identified by the first precoder indicator, and a second PUSCH communication on a second antenna panel using a precoder identified by the second precoder indicator. In some aspects, the UE 120 may transmit the first PUSCH communication to a first TRP (e.g., associated with the BS 110) and the second PUSCH communication to a second TRP (e.g., associated with the BS 110 or another BS). In some aspects, the UE 120 may transmit the first PUSCH communication and the second PUSCH communication to the BS 110 (e.g., in a coordinated manner).

In some aspects, in connection with communicating using multiple antenna panels, the UE 120 may map coded bits of an uplink communication to the multiple antenna panels. For example, the UE 120 may map coded bits of the uplink communication to multiple layers that are to be transmitted on the multiple antenna panels. In some aspects, the UE 120 may map the coded bits first by antenna panel (e.g., inter-panel), second by layer (e.g., intra-panel), third by frequency, and fourth by time, as described in connection with FIG. 5. In some aspects, the UE 120 may map the coded bits first by layer (e.g., intra-panel), second by frequency, third by time, and fourth by antenna panel (e.g., inter-panel), as described in connection with FIG. 5.

In this way, the UE 120 may communicate using multiple antenna panels based at least in part on DCI that has a reduced overhead.

FIG. 3B shows multiplexing of a first PUSCH communication and a second PUSCH communication, as described in connection with FIG. 3A. In particular, FIG. 3B shows a spatial-division multiplexing (SDM) 325 of the PUSCH communications, a time-division multiplexing (TDM) 330 of the PUSCH communications, and a frequency-division multiplexing (FDM) 335 of the PUSCH communications.

According to the SDM 325 (e.g., non-coherent joint transmission), the UE 120 may transmit the first PUSCH communication 340 (shown as a first layer) and the second PUSCH communication 345 (shown as a second layer) in a same time and frequency resource. According to the TDM 330, the UE 120 may transmit the first PUSCH communication 340 and the second PUSCH communication 345 in a same frequency resource and different time resources. According to FDM 335, the UE 120 may transmit the first PUSCH communication 340 and the second PUSCH communication 345 in the same time resource and different frequency resources.

In some aspects, the UE 120 may transmit the first PUSCH communication 340 using a first antenna panel 350, and the UE 120 may transmit the second PUSCH communication 345 using a second antenna panel 355. In other words, the UE 120 may form a first beam on the first antenna panel 350 using a precoder identified by the first precoder indicator, and the UE 120 may form a second beam on the second antenna panel 355 using a precoder identified by the second precoder indicator.

For a codebook-based MIMO, a TPMI index per antenna panel may be identified by DCI, an uplink TCI per antenna panel may be identified by DCI, and an SRS set for codebook per panel may be RRC configured. For non-codebook-based MIMO, an SRI index per antenna panel may be identified by DCI, an uplink TCI per antenna panel may be identified by DCI, and an SRS set for non-codebook per panel may be RRC configured.

As indicated above, FIGS. 3A and 3B are provided as examples. Other examples may differ from what is described with respect to FIGS. 3A and 3B.

FIG. 4 is a diagram illustrating an example 400 of frequency resource splitting patterns, in accordance with various aspects of the present disclosure. As shown in FIG. 4, a frequency resource splitting pattern may be associated with a PRG or a wideband channel. For example, frequency resource splitting patterns 405, 410, and 415 may be associated with a PRG, and frequency resource splitting pattern 420 may be associated with a wideband channel.

According to frequency resource splitting pattern 405, resource blocks 425 of a PRG may be split between a first antenna panel and a second antenna panel in an alternating manner in increments of one resource block. For example, a first resource block may be assigned to a first antenna panel, a second resource block may be assigned to a second antenna panel, a third resource block may be assigned to the first antenna panel, a fourth resource block may be assigned to the second antenna panel, and so forth.

According to frequency resource splitting pattern 410, resource blocks 425 of a PRG may be split between a first antenna panel and a second antenna panel in an alternating manner in increments of two resource blocks. For example, first and second resource blocks may be assigned to a first antenna panel, third and fourth resource blocks may be assigned to a second antenna panel, fifth and sixth resource blocks may be assigned to the first antenna panel, seventh and eighth resource blocks may be assigned to the second antenna panel, and so forth.

According to frequency resource splitting pattern 415, resource blocks 425 of a PRG may be split between a first antenna panel and a second antenna panel in an alternating manner in increments of four resource blocks. For example, first, second, third, and fourth resource blocks may be assigned to a first antenna panel, fifth, sixth, seventh, and eighth resource blocks may be assigned to a second antenna panel, and so forth.

According to frequency resource splitting pattern 420, resource blocks 425 of a wideband channel may be split in equal halves between a first antenna panel and a second antenna panel. For example, a first contiguous half of resource blocks of the wideband channel may be assigned to a first antenna panel and a second contiguous half of resource blocks of the wideband channel may be assigned to a second antenna panel.

As indicated above, FIG. 4 is provided as an example. Other examples may differ from what is described with respect to FIG. 4.

Figure 5:
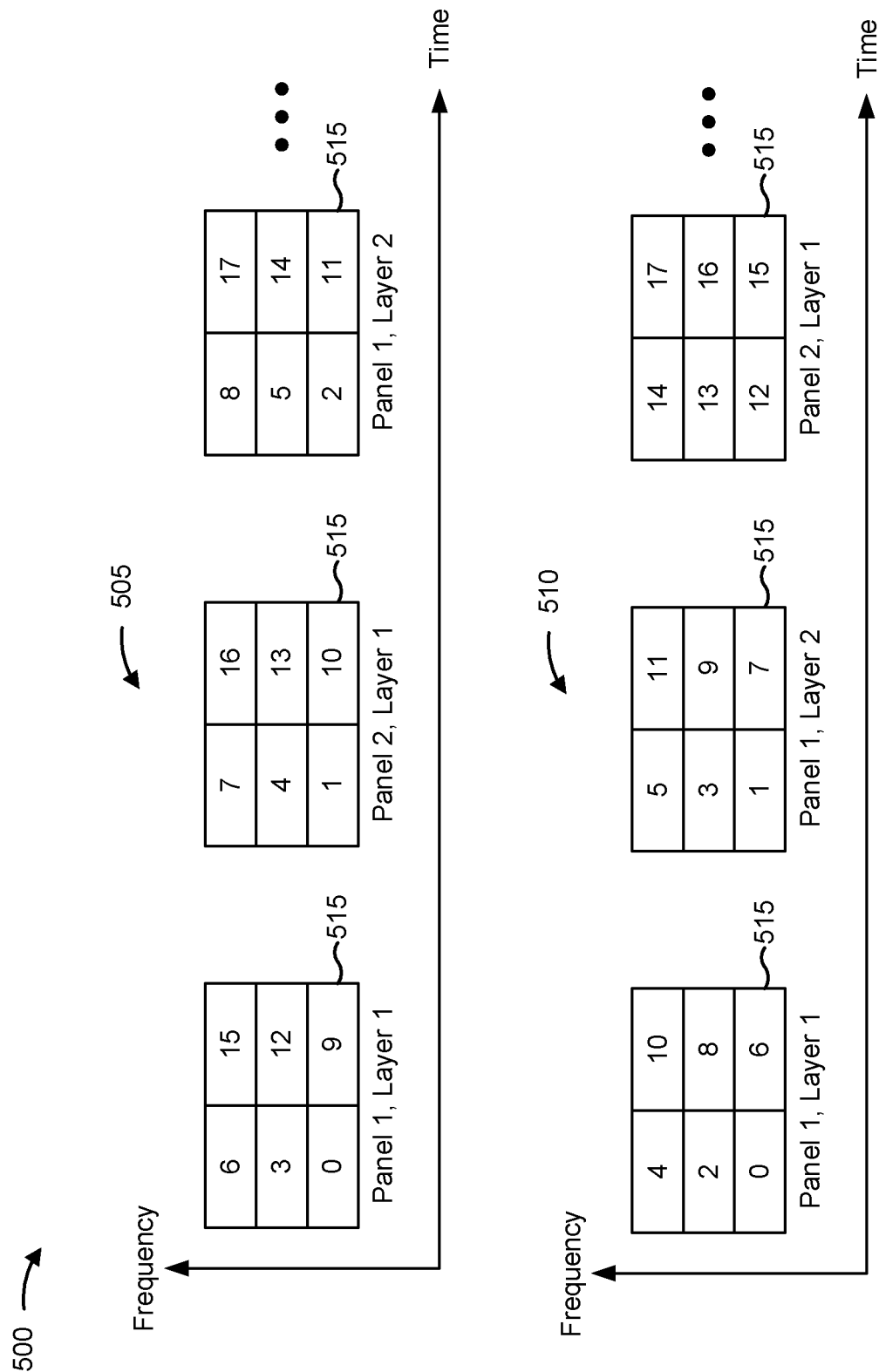
FIG. 5 is a diagram illustrating an example of coded bit mappings for multi-panel transmissions, in accordance with various aspects of the present disclosure.

FIG. 5 is a diagram illustrating an example 500 of coded bit mappings for multi-panel transmissions, in accordance with various aspects of the present disclosure. As shown in FIG. 5, coded bits of an uplink communication having multiple layers may be mapped to multiple antenna panels. The coded bits may be mapped according to mapping scheme 505 or mapping scheme 510.

According to mapping scheme 505, coded bits (shown as bits 0-17) may be mapped to resource units 515 (e.g., resource blocks, resource elements, and/or the like) first by antenna panel, second by layer, third by frequency, and fourth by time. According to mapping scheme 510, coded bits (shown as bits 0-17) may be mapped to resource units 515 (e.g., resource blocks, resource elements, and/or the like) first by layer, second by frequency, third by time, and fourth by antenna panel.

As indicated above, FIG. 5 is provided as an example. Other examples may differ from what is described with respect to FIG. 5.

Figure 6:
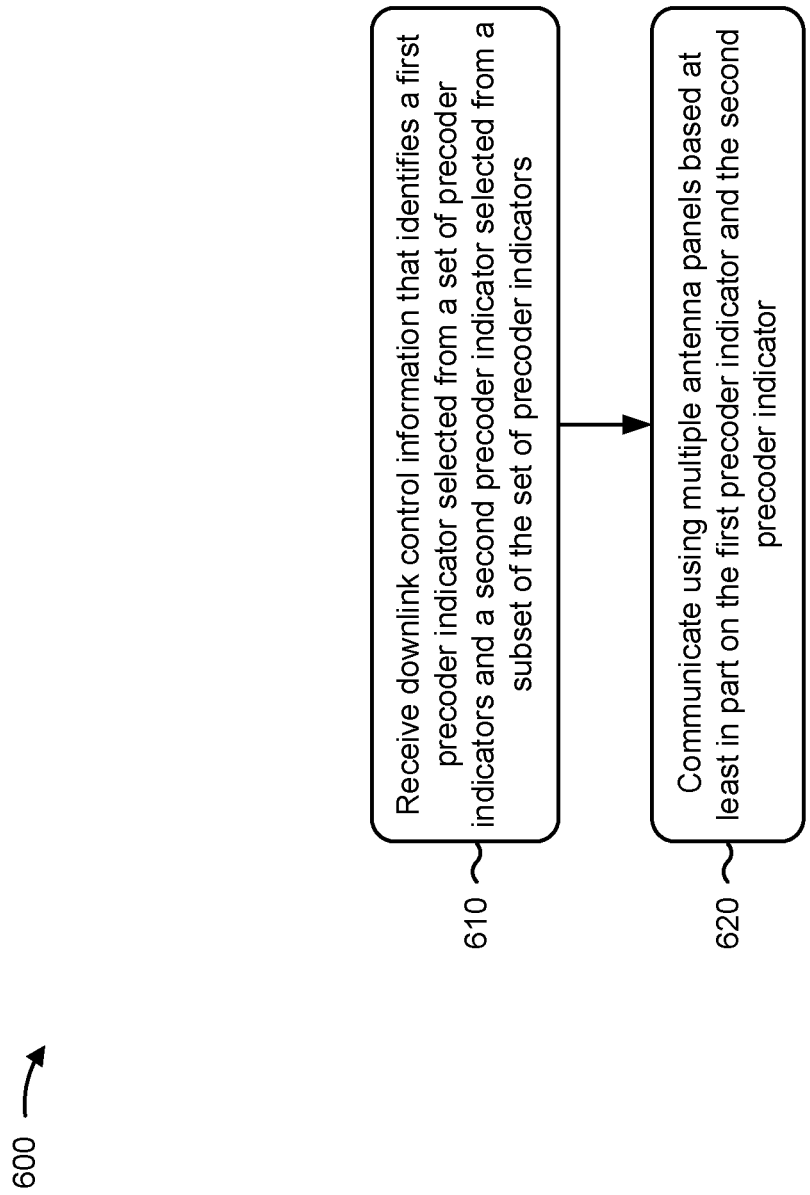
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, and/or the like) performs operations associated with precoder indication in DCI.

As shown in FIG. 6, in some aspects, process 600 may include receiving DCI that identifies a first precoder indicator selected from a set of precoder indicators and a second precoder indicator selected from a subset of the set of precoder indicators (block 610). For example, the UE (e.g., using antenna 252, DEMOD 254, MIMO detector 256, receive processor 258, controller/processor 280, and/or the like) may receive DCI that identifies a first precoder indicator selected from a set of precoder indicators and a second precoder indicator selected from a subset of the set of precoder indicators, as described above.

As further shown in FIG. 6, in some aspects, process 600 may include communicating using multiple antenna panels based at least in part on the first precoder indicator and the second precoder indicator (block 620). For example, the UE (e.g., using controller/processor 280, transmit processor 264, TX MIMO processor 266, MOD 254, antenna 252, and/or the like) may communicate using multiple antenna panels based at least in part on the first precoder indicator and the second precoder indicator, as described above.

Process 600 may include additional aspects, such as any single aspect or any combination of aspects described below and/or in connection with one or more other processes described elsewhere herein.

In a first aspect, the DCI identifies the first precoder indicator using a first quantity of bits and the second precoder indicator using a second quantity of bits that is less than the first quantity of bits. In a second aspect, alone or in combination with the first aspect, the first precoder indicator and the second precoder indicator identify respective transmission rank and TPMI combinations or respective SRI combinations.

In a third aspect, alone or in combination with one or more of the first and second aspects, the first precoder indicator is associated with at least one of a particular transmission rank or a particular coherence type. In a fourth aspect, alone or in combination with one or more of the first through third aspects, the subset includes only the precoder indicators of the set that are associated with the particular transmission rank. In a fifth aspect, alone or in combination with one or more of the first through fourth aspects, the subset includes only the precoder indicators of the set that are associated with the particular transmission rank and the particular coherence type.

In a sixth aspect, alone or in combination with one or more of the first through fifth aspects, the DCI identifies first frequency resources that are to be used for a first antenna panel of the multiple antenna panels and second frequency resources that are to be used for a second antenna panel of the multiple antenna panels. In a seventh aspect, alone or in combination with one or more of the first through sixth aspects, the DCI identifies a frequency resource splitting pattern that identifies the first frequency resources and the second frequency resources. In an eighth aspect, alone or in combination with one or more of the first through seventh aspects, the frequency resource splitting pattern is identified in a same field of the DCI that identifies the first precoder indicator and the second precoder indicator.

In a ninth aspect, alone or in combination with one or more of the first through eighth aspects, the first precoder indicator is associated with a particular transmission configuration indicator identified by the DCI.

In a tenth aspect, alone or in combination with one or more of the first through ninth aspects, communicating using the multiple antenna panels includes mapping coded bits of an uplink communication to multiple layers that are to be transmitted on the multiple antenna panels first by antenna panel, second by layer, third by frequency, and fourth by time. In an eleventh aspect, alone or in combination with one or more of the first through tenth aspects, communicating using the multiple antenna panels includes mapping coded bits of an uplink communication to multiple layers that are to be transmitted on the multiple antenna panels first by layer, second by frequency, third by time, and fourth by antenna panel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
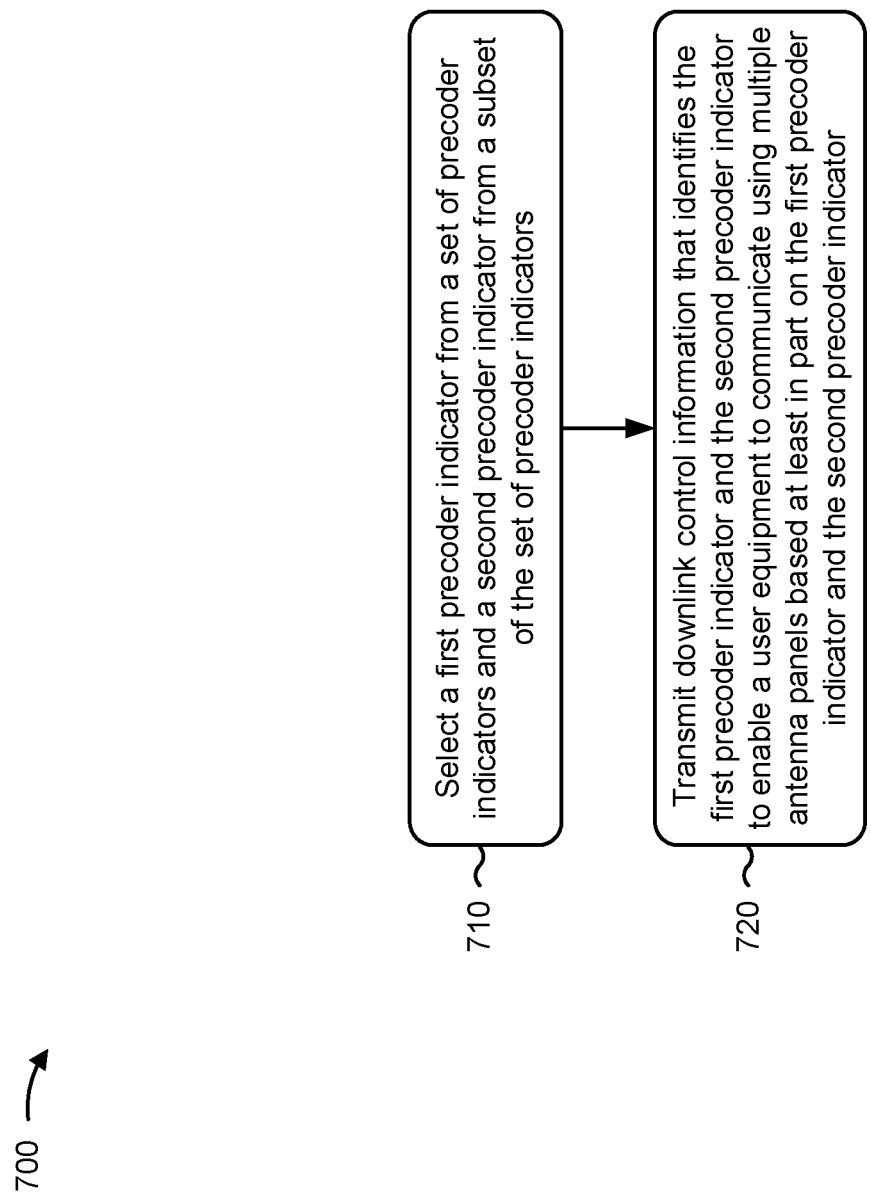
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110, and/or the like) performs operations associated with precoder indication in DCI.

As shown in FIG. 7, in some aspects, process 700 may include selecting a first precoder indicator from a set of precoder indicators and a second precoder indicator from a subset of the set of precoder indicators (block 710). For example, the BS (e.g., using controller/processor 240, and/or the like) may select a first precoder indicator from a set of precoder indicators and a second precoder indicator from a subset of the set of precoder indicators, as described above.

As further shown in FIG. 7, in some aspects, process 700 may include transmitting DCI that identifies the first precoder indicator and the second precoder indicator to enable a UE to communicate using multiple antenna panels based at least in part on the first precoder indicator and the second precoder indicator (block 720). For example, the BS (e.g., using controller/processor 240, transmit processor 220, TX MIMO processor 230, MOD 232, antenna 234, and/or the like) may transmit DCI that identifies the first precoder indicator and the second precoder indicator to enable a UE to communicate using multiple antenna panels based at least in part on the first precoder indicator and the second precoder indicator, as described above.

Process 700 may include additional aspects, such as any single aspect or any combination of aspects described below and/or in connection with one or more other processes described elsewhere herein.

In a first aspect, the DCI identifies the first precoder indicator using a first quantity of bits and the second precoder indicator using a second quantity of bits that is less than the first quantity of bits. In a second aspect, alone or in combination with the first aspect, the first precoder indicator and the second precoder indicator identify respective transmission rank and TPMI combinations or respective SRI combinations.

In a third aspect, alone or in combination with one or more of the first and second aspects, the first precoder indicator is associated with at least one of a particular transmission rank or a particular coherence type. In a fourth aspect, alone or in combination with one or more of the first through third aspects, the subset includes only the precoder indicators of the set that are associated with the particular transmission rank. In a fifth aspect, alone or in combination with one or more of the first through fourth aspects, the subset includes only the precoder indicators of the set that are associated with the particular transmission rank and the particular coherence type.

In a sixth aspect, alone or in combination with one or more of the first through fifth aspects, the DCI identifies first frequency resources that are to be used by the UE for a first antenna panel of the multiple antenna panels and second frequency resources that are to be used by the UE for a second antenna panel of the multiple antenna panels. In a seventh aspect, alone or in combination with one or more of the first through sixth aspects, the DCI identifies a frequency resource splitting pattern that identifies the first frequency resources and the second frequency resources. In an eighth aspect, alone or in combination with one or more of the first through seventh aspects, the frequency resource splitting pattern is identified in a same field of the DCI that identifies the first precoder indicator and the second precoder indicator.

In a ninth aspect, alone or in combination with one or more of the first through eighth aspects, the first precoder indicator is associated with a particular transmission configuration indicator identified by the DCI.

In a tenth aspect, alone or in combination with one or more of the first through ninth aspects, the UE is to communicate using the multiple antenna panels by mapping coded bits of an uplink communication to multiple layers that are to be transmitted on the multiple antenna panels first by antenna panel, second by layer, third by frequency, and fourth by time. In an eleventh aspect, alone or in combination with one or more of the first through tenth aspects, the UE is to communicate using the multiple antenna panels by mapping coded bits of an uplink communication to multiple layers that are to be transmitted on the multiple antenna panels first by layer, second by frequency, third by time, and fourth by antenna panel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
 receiving downlink control information (DCI) that identifies a first precoder indicator selected from a set of precoder indicators and a second precoder indicator selected from a subset of the set of precoder indicators, wherein the first precoder indicator is a sounding reference signal (SRS) resource indicator (SRI) for a noncodebook-based transmission; and
 communicating using multiple antenna panels based at least in part on the first precoder indicator and the second precoder indicator.

2. The method of claim 1, wherein the DCI identifies the first precoder indicator using a first quantity of bits and the second precoder indicator using a second quantity of bits that is less than the first quantity of bits.

3. The method of claim 1,
 wherein the SRI is a first SRI, and
 wherein the second precoder indicator is a second SRI for the noncodebook-based transmission.

4. The method of claim 1, wherein the first precoder indicator is associated with at least one of a particular transmission rank or a particular coherence type.

5. The method of claim 4, wherein the subset includes only the precoder indicators of the set that are associated with the particular transmission rank.

6. The method of claim 4, wherein the subset includes only the precoder indicators of the set that are associated with the particular transmission rank and the particular coherence type.

7. The method of claim 1, wherein the DCI identifies first frequency resources that are to be used for a first antenna panel of the multiple antenna panels and second frequency resources that are to be used for a second antenna panel of the multiple antenna panels.

8. The method of claim 7, wherein the DCI identifies a frequency resource splitting pattern that identifies the first frequency resources and the second frequency resources.

9. The method of claim 8, wherein the frequency resource splitting pattern is identified in a same field of the DCI that identifies the first precoder indicator and the second precoder indicator.

10. The method of claim 1, wherein the first precoder indicator is associated with a particular transmission configuration indicator identified by the DCI.

11. The method of claim 1, wherein communicating using the multiple antenna panels comprises:
 mapping coded bits of an uplink communication to multiple layers that are to be transmitted on the multiple antenna panels first by antenna panel, second by layer, third by frequency, and fourth by time.

12. The method of claim 1, wherein communicating using the multiple antenna panels comprises:
 mapping coded bits of an uplink communication to multiple layers that are to be transmitted on the multiple antenna panels first by layer, second by frequency, third by time, and fourth by antenna panel.

13. A method of wireless communication performed by a network entity, comprising:
 selecting a first precoder indicator from a set of precoder indicators and a second precoder indicator from a subset of the set of precoder indicators, wherein the first precoder indicator is a sounding reference signal (SRS) resource indicator (SRI) for a noncodebook-based transmission; and
 transmitting downlink control information (DCI) that identifies the first precoder indicator and the second precoder indicator to enable a user equipment (UE) to communicate using multiple antenna panels based at least in part on the first precoder indicator and the second precoder indicator.

14. The method of claim 13, wherein the DCI identifies the first precoder indicator using a first quantity of bits and the second precoder indicator using a second quantity of bits that is less than the first quantity of bits.

15. The method of claim 13, wherein the SRI is a first SRI, and
 wherein the second precoder indicator identify is a second SRI for the noncodebook-based transmission.

16. The method of claim 13, wherein the first precoder indicator is associated with at least one of a particular transmission rank or a particular coherence type.

17. The method of claim 16, wherein the subset includes only the precoder indicators of the set that are associated with the particular transmission rank.

18. The method of claim 16, wherein the subset includes only the precoder indicators of the set that are associated with the particular transmission rank and the particular coherence type.

19. The method of claim 13, wherein the DCI identifies first frequency resources that are to be used by the UE for a first antenna panel of the multiple antenna panels and second frequency resources that are to be used by the UE for a second antenna panel of the multiple antenna panels.

20. The method of claim 19, wherein the DCI identifies a frequency resource splitting pattern that identifies the first frequency resources and the second frequency resources.

21. The method of claim 20, wherein the frequency resource splitting pattern is identified in a same field of the DCI that identifies the first precoder indicator and the second precoder indicator.

22. The method of claim 13, wherein the first precoder indicator is associated with a particular transmission configuration indicator identified by the DCI.

23. The method of claim 13, wherein the UE is to communicate using the multiple antenna panels by mapping coded bits of an uplink communication to multiple layers that are to be transmitted on the multiple antenna panels first by antenna panel, second by layer, third by frequency, and fourth by time.

24. The method of claim 13, wherein the UE is to communicate using the multiple antenna panels by mapping coded bits of an uplink communication to multiple layers that are to be transmitted on the multiple antenna panels first by layer, second by frequency, third by time, and fourth by antenna panel.

25. A user equipment (UE) for wireless communication, comprising:
 one or more memories; and
 one or more processors, coupled to the one or more memories, configured to:
  receive downlink control information (DCI) that identifies a first precoder indicator selected from a set of precoder indicators and a second precoder indicator selected from a subset of the set of precoder indicators, wherein the first precoder indicator is a sounding reference signal (SRS) resource indicator (SRI) for a noncodebook-based transmission; and
  communicate using multiple antenna panels based at least in part on the first precoder indicator and the second precoder indicator.

26. A base station for wireless communication, comprising:
one or more memories; and
one or more processors, coupled to the one or more memories, configured to:
select a first precoder indicator from a set of precoder indicators and a second precoder indicator from a subset of the set of precoder indicators, wherein the first precoder indicator is a sounding reference signal (SRS) resource indicator (SRI) for a noncodebook-based transmission; and
transmit downlink control information (DCI) that identifies the first precoder indicator and the second precoder indicator to enable a user equipment (UE) to communicate using multiple antenna panels based at least in part on the first precoder indicator and the second precoder indicator.

27. An apparatus for wireless communication, comprising:
means for receiving downlink control information (DCI) that identifies a first precoder indicator selected from a set of precoder indicators and a second precoder indicator selected from a subset of the set of precoder indicators, wherein the first precoder indicator is a sounding reference signal (SRS) resource indicator (SRI) for a noncodebook-based transmission; and
means for communicating using multiple antenna panels based at least in part on the first precoder indicator and the second precoder indicator.

* * * * *